July 9, 1968  T. DEEG  3,391,558
DEVICE FOR MAGNETIC-PULSE FORMING OF METALLIC WORKPIECES
Filed Aug. 18, 1965  4 Sheets-Sheet 1

July 9, 1968  T. DEEG  3,391,558
DEVICE FOR MAGNETIC-PULSE FORMING OF METALLIC WORKPIECES
Filed Aug. 18, 1965  4 Sheets-Sheet 2

July 9, 1968 T. DEEG 3,391,558
DEVICE FOR MAGNETIC-PULSE FORMING OF METALLIC WORKPIECES
Filed Aug. 18, 1965 4 Sheets-Sheet 3
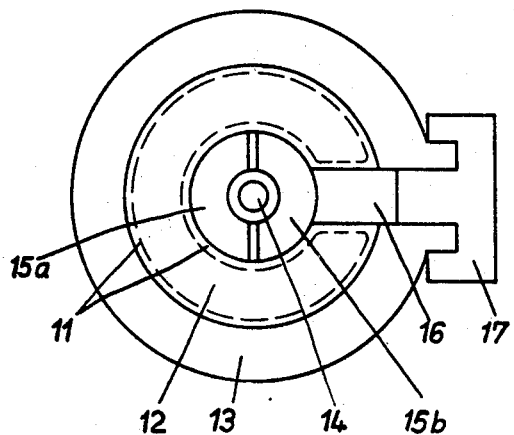
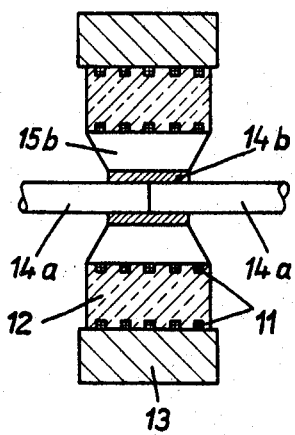
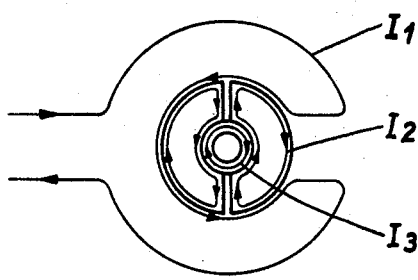

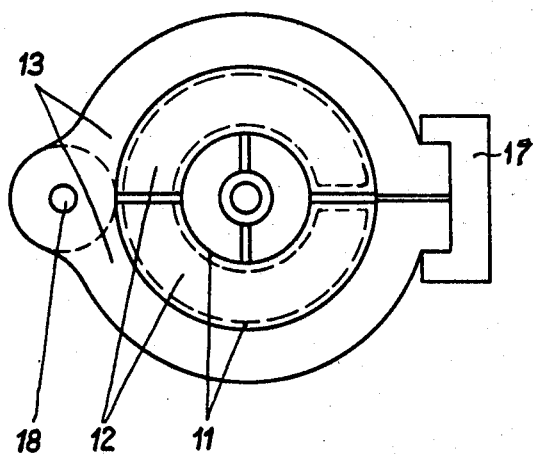
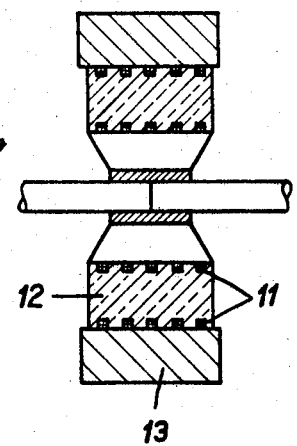
Fig. 12  Fig. 13
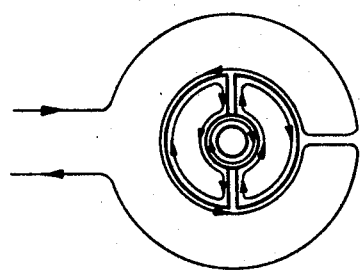
Fig. 14

United States Patent Office 3,391,558
Patented July 9, 1968

3,391,558
DEVICE FOR MAGNETIC-PULSE FORMING OF METALLIC WORKPIECES
Theodor Deeg, Berlin, Germany, assignor to Siemens Aktiengesellschaft, a corporation of Germany
Filed Aug. 18, 1965, Ser. No. 480,746
Claims priority, application Germany, Sept. 3, 1964, S 92,972
15 Claims. (Cl. 72—56)

ABSTRACT OF THE DISCLOSURE

Device for magnetic-pulse forming of metallic workpieces includes a work coil to be traversed by pulsating current, the coil having turns defining an internal magnetic field space and an external magnetic field space of which only the internal field space is located within the respective coil turns, a transfer structure located outside of the internal field space and inductively coupled with the coil in the external field space, the transfer structure having a recess for receiving the workpiece and imposing upon it a compressive forming effect due to the external coil field when in operation.

My invention relates to devices for magnetic-pulse forming of metallic workpieces.

It is known to form workpieces of metal by passing pulsating currents of high intensity through a work coil to thereby induce electric currents in the workpieces at the localities to be formed, which currents coact with the simultaneously effective magnetic fields to furnish the forces required for the forming operation. For performing such work on round workpieces, such as for joining the respective ends of two aligned tubes, the current-carrying coils are axially shoved into the workpieces. The magnetic flux occurring in the coil traversed by a high-intensity pulsating current then produces short-circuit currents in the metallic workpiece to be formed, and these short circuits, conjointly with the magnetic field, produce forces in radially inward directions which cause a corresponding deformation of the tube end.

The interior of such a coil, however, is accessible only in the axial direction. This is a considerable shortcoming and prevents the use of such coils for workpieces which, after being formed in the described manner, can no longer be separated from the coil by axially displacing one relative to the other.

It is conceivable to then separate the coil from the workpiece by unwinding the coil as it normally comprises several turns, or by longitudinally dividing the coil into two mutually separable portions; but neither of these solutions is feasible in practice.

It is an object of my invention to devise a magnetic-pulse forming device applicable for the purposes just mentioned but readily permitting a separation of the coil from the workpiece upon completion of the forming operation.

Another object of the invention is to provide a magnetic-pulse forming device which additionally affords being used for workpieces of different sizes and shapes.

According to my invention, therefore, I provide a device for the magnetic-pulse compression forming of metallic workpieces, but employ for this purpose not the internal field of the work coil but rather the external field which I use to induce pulsating currents in a rigid transfer structure having a recess for receiving the workpiece to be compressively acted upon. The invention thus takes advantage of the fact that the magnetic flux through the interior of a coil is equal to the flux outside the coil, and that the outside flux is accessible in the radial direction.

According to another feature of the invention, I provide such a device with a two-part transfer structure whose two portions jointly surround the coil as well as the workpieces, the latter being arranged beside the coil in parallel relation to the coil axis.

The above-mentioned and further objects, advantages and features of my invention, said features being set forth with particularity in the claims annexed hereto, will be apparent from, and will be described in, the following with reference to embodiments of devices according to the invention illustrated by way of example on the accompanying drawings, in which:

FIG. 9 shows a lateral view of still another embodiment; FIG. 10 is a cross section thereof, and FIG. 11 is an explanatory diagram of the corresponding current flow paths.

FIG. 12 is a lateral view of a further embodiment; FIG. 13 is a cross section of the same device; and FIG. 14 is an explanatory diagram representing schematically the corresponding current flow paths.

Figure 1:
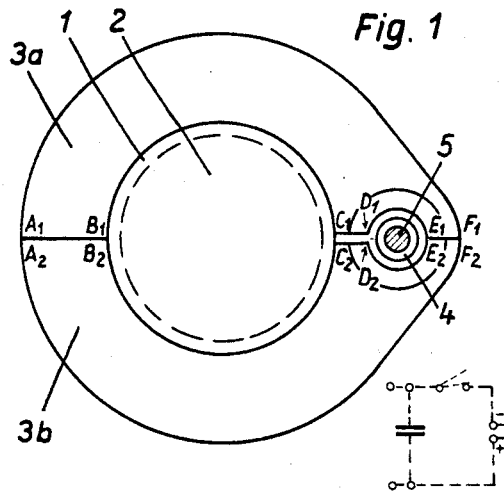
FIG. 1 shows a lateral view and FIG. 2 a cross section of a first embodiment comprising a two-part transfer member for transferring the external magnetic field of the coil onto the workpiece to be formed.
Figure 2:
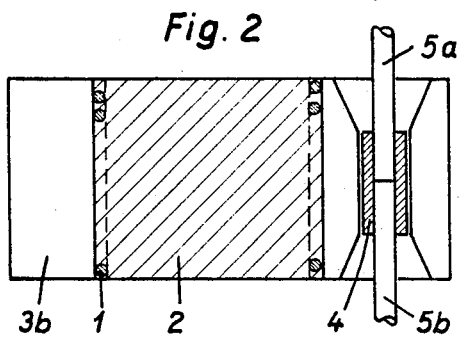

Referring to FIGS. 1 and 2, the illustrated magnetic-pulse forming device comprises a primary coil 1 of cylindrical shape having a multiplicity of helical turns which is inserted in a rigid supporting body 2 of insulating material. The coil is provided with a ring-shaped transfer structure composed of two massive half-portions 3a, 3b of good conducting material, which tightly encloses the coil and is closely coupled inductively therewith. The transfer structure has a cylindrical recess diametrically bisected by the separation gap between the two half-portions 3a and 3b, the axis of the recess being parallel to the axis of the coil 1. The cylindrical recess serves to receive the workpiece to be formed.

The workpiece may consist, for example, of a copper sleeve 4 to be swaged upon the ends of two conductors 5a and 5b for rigidly joining them in coaxial alignment. The two half portions 3a and 3b of the ring structure are preferably coated with suitable contact material at the two outer contact faces $A_1$–$B_1$ and $A_2$–$B_2$, as well as at the outer contact faces $E_1$–$F_1$ and $E_2$–$F_2$. However, at the area portion $C_1$–$D_1$ and $C_2$–$D_2$ there remains an insulating gap of smallest feasible thickness extending from the coil 1 to beyond the locality of the workpiece.

Figure 3:
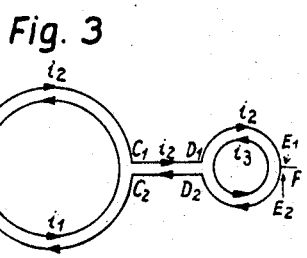
FIG. 3 is explanatory and represents schematically the current flow paths occurring in a device according to FIGS. 1 and 2.

The current paths resulting under these conditions in the coil, transfer ring and workpiece is schematically represented in FIG. 3. The current pulses for operating the magnetic-pulse forming device are produced, as a rule, by periodically charging one or more capacitors and abruptly discharging them through the forming coil. When the charged capacitance is switched onto the coil, the current $i_1$ commences to build up in the primary coil 1 and induces in the two half-portions of the ring a rotational voltage which causes a flow of secondary current $i_2$. Since the half portions of the ring member are massive, the current $i_2$, on account of the skin effect, does not penetrate deeply into the ring structure but flows close to the inner cylindrical surface along coil 1 from $B_1$ to $C_1$ where the insulating gap directs the current via $D_1$ about the workpiece toward $E_1$. Thence the current passes through the contact face $E_1$–$F_1$ to the lower half portion $3b$ of the ring where it passes symmetrically through $E_2$, $D_2$, $C_2$, $B_2$ back to $B_1$. This induces in the workpiece 4 the working current $i_3$ which, in conjunction with the magnetic fields, causes the desired compressing action.

Figure 5:
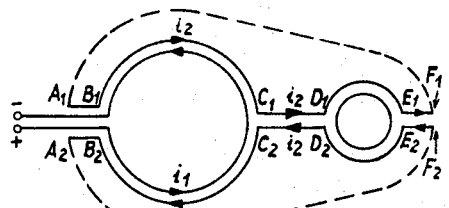
FIG. 5 is an explanatory diagram representing a corresponding current-flow diagram.
Figure 4:
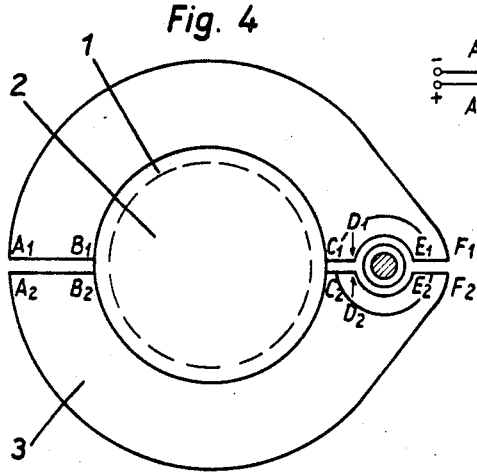
FIG. 4 shows a lateral view of another embodiment.

The device operates on the same principle even if the contact surfaces A, B and E, F are not coated with particularly good conducting material. Important is only that the half portions of the ring structure are insulated from each other in the region C–E and that the workpiece 4 does not electrically bridge the two half portions. A device of this kind is illustrated in FIG. 4, and the corresponding current paths are shown schematically in FIG. 5. As is indicated in FIG. 5 by broken lines the secondary current $i_2$ induced in the transfer structure then flows through the outer surface region in each half-portion of the ring which is only weakly coupled with the primary coil 1. If some amount of electrical contact obtains between the two half-portions of the ring structure in the gaps A–B and E–F, a portion of the currents may find a closed path through the two half-portions of the ring according to FIG. 3, whereas another portion of the current will flow back along the outer surface of the two half-portions according to the broken line in FIG. 5.

Figure 6:
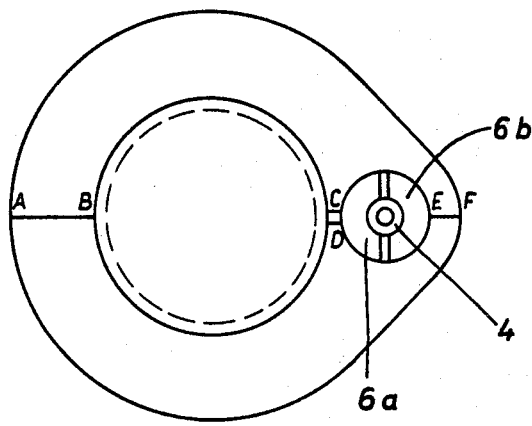
FIG. 6 is a lateral view of still another forming device according to the invention.
Figure 7:
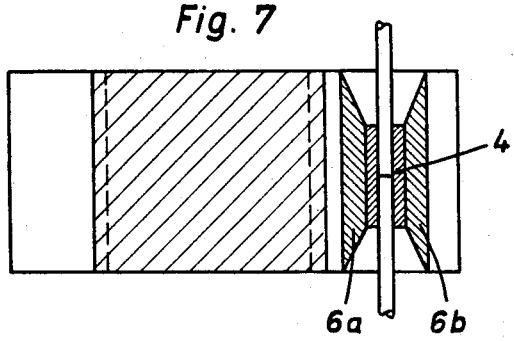
FIG. 7 shows a cross section of the same device.
Figure 8:
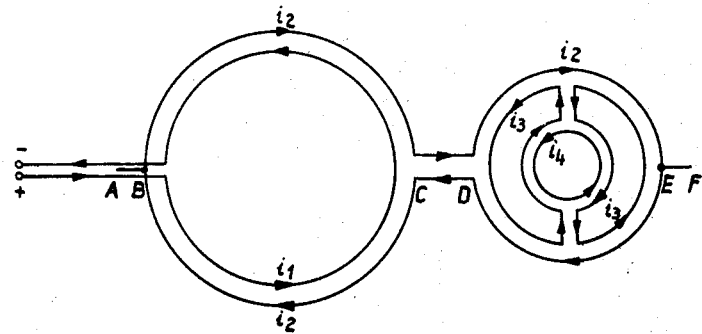
FIG. 8 is an explanatory diagram representing the current flow paths occurring in such a device.

For adapting the device to workpieces of different dimensions, the recess for receiving the workpiece 4 may be made larger than required for the smaller workpieces, and the interspace may be filled with separately inserted two-part field concentrators $6a$ and $6b$ which are adapted to the particular workpiece to be processed. Such a device is shown in FIGS. 6 and 7. The two half-portions of this field concentrator which are insulated from each other and from all adjacent parts, are then traversed by a tertiary current $i_3$ which is induced by the secondary current $i_2$ and which in turn induces the working current $i_4$ proper in the workpiece 4.

The two half-portions $3a$ and $3b$ of the transfer structure must be firmly tensioned or clamped against each other in order to be capable of taking up the forces which during operation tend to spread the ring structure apart. For insertion or removal of the workpieces 4, one of the half-portions of the ring structure can be lifted off. If desired, however, the two half-portions may be joined by a hinge to permit tilting them to open position relative to each other.

It is not always necessary to utilize the entire magnetic field of the primary coil for the forming process, but suffices to apply only a portion, for example one half of the coil perimeter, for providing the required magnetic coupling. One way of doing this is to wind the primary coil to an approximate kidney-shaped or C-shaped configuration so that it possesses a lateral gap extending parallel to the coil axis to permit placing the workpiece from the side into the gap.

An embodiment of such a C-type coil is illustrated in FIGS. 9 and 10, the corresponding current flow paths schematically represented in FIG. 11. The coil formed of the conductor turns 11 is embedded in a coil carrier 12 of rigid insulating material which is surrounded by an external holder structure 13 of conducting material. The coil is wound to an approximate C-shaped configuration so as to provide for a lateral gap extending parallel to the coil axis, into which gap the workpiece to be formed can be inserted from the side. The workpiece, for example, consists of two conductor ends $14a$, which are to be permanently joined by a sleeve $14b$, the parts $14a$ and $14b$ consisting of copper.

With such a C-configuration coil, each individual turn of the conductor 11 surrounds a C-shaped rather than a closed circular (O-shaped) area. Hence the internal field space of the C-coil is completely filled by the rigid insulating material of the carrier 12, and the external field space extends partly within the central bight of the C-configuration and partly along the outer back of the C-shape.

The workpiece is located in the recess thus formed by the bight space of the C-coil. The transfer structure comprises a longitudinally subdivided intermediate piece of rigid, good conducting material which fills the interspace between the workpiece and the inner perimeter of the coil. In the illustrated embodiment, the intermediate piece is formed of two mutually insulated half-portions $15a$ and $15b$ insertable and removable in the axial direction. The separation gap preferably extends in a plane perpendicular to the radial direction of the gap in the C-shaped coil.

The gap of the coil and aligned gap in the coil carrier 12 are closed by a filler piece 16. The ends of the holder 13 adjacent to the gap form respective projections extending radially outward, and a clamping claw 17 is forced over these projections in order to securely close the gap.

As schematically represented in FIG. 11, the primary current $I_1$ flowing in the coil induces secondary currents $I_2$ in the intermediate pieces. The secondary currents cause a tertiary current $I_3$ to flow on a circular path in the workpiece. The current $I_3$ in coaction with the magnetic field of the coil produces the forces which cause the desired deformation of the workpiece. By virtue of the illustrated device, a uniform forming action upon the workpiece over the entire periphery is secured despite the fact that a current flow does not occur in the opening gap of the coil structure.

FIGS. 12 and 13 show an embodiment in which the coil structure consists of two half-portions joined by a hinge so that the coil can be opened. The carrier 12 of the winding 11 is formed of two parts and is secured in a holder structure 13 likewise consisting of two parts whose two legs are joined by a hinge 18. By virtue of such a hinge design, the primary current flows virtually about the entire periphery of the workpiece despite the lateral gap, as will be seen from the flow diagram shown in FIG. 14.

The transfer structures $3a$ and $3b$, the field concentrators $6a$ and $6b$, the intermediate pieces $15a$, $15b$ and the filler piece 16 should combine good electrical conductance with mechanical strength and are preferably made of copper beryllium alloy. Where a good electrical surface contact is needed, such as at areas $A_1$–$B_1$, $A_2$–$B_2$, $E_1$–$F_1$, and $E_2$–$F_2$ (FIG. 1), a coating of silver may be provided. The holder structure 13 (FIGS. 12, 13) may consist of mechanically strong insulating material, such as hardened epoxy resin reinforced by embedded glass fibers. If the holder structure 13 is to augment the action of the coil by induced eddy currents, the holder material should be made of mechanically strong and electrically conducting material such as copper beryllium. The claw 17 (FIGS. 9, 12) serves a mechanical purpose only. Hence it consists of mechanically strong material, preferably steel.

Upon a study of this disclosure, it will be obvious to those skilled in the art that my invention permits of various modifications and may be given embodiments other than particularly illustrated and described herein, without departing from the essential features of my invention and within the scope of the claims annexed hereto.

I claim:

1. Device for magnetic-pulse forming of metallic workpieces, comprising a work coil to be traversed by pulsating current, said coil having turns defining an internal magnetic field space and an external magnetic field space of which only said internal field space is located within said respective coil turns, a transfer structure located outside of said internal field space and inductively coupled with said coil in said external field space, said transfer structure having a recess for receiving the workpiece and imposing upon it a compressive forming effect due to the external coil field when in operation.

2. Device for magnetic-pulse forming of metallic workpieces, comprising a work coil to be traversed by pulsating current, said coil having turns defining an internal magnetic field space and an external magnetic field space of which only said internal field space is located within said respective coil turns, a transfer structure inductively coupled with said coil in said external field space, said transfer structure having a recess for receiving the workpiece and imposing upon it a compressive forming effect due to the external coil field when in operation, said work coil having cylindrical shape, said transfer structure surrounding said coil and having said recess extend laterally of said coil in a direction parallel to the coil axis so as to also surround the workpiece when in operation.

3. In a magnetic-pulse forming device according to claim 2, said transfer structure comprising a ring closely surrounding said coil and composed of two arcuate portions forming a gap between each other, said recess being located at said gap and being bisected thereby.

4. In a magnetic-pulse forming device according to claim 3, said two ring portions being electrically insulated from each other.

5. In a magnetic-pulse forming device according to claim 3, said two ring portions electrically contacting each other in parts of said gap at the radially outer sides of said coil and of said recess respectively, and said two ring portions being insulated from each other in the part of said gap located between said coil and said recess.

6. In a magnetic-pulse forming device according to claim 2, said transfer structure comprising a ring closely surrounding said coil and composed of two half-portions, forming a gap between each other, said recess being located at said gap and being bisected thereby, and means engageable with said half-portions for clamping them together.

7. In a magnetic-pulse forming device according to claim 2, said transfer structure comprising a ring closely surrounding said coil and composed of two half-portions forming a gap between each other, said recess being located at said gap and being bisected thereby, and hinge means articulately joining said two half-portions to each other to permit turning them to open position relative to each other.

8. In a magnetic-pulse forming device according to claim 1, said transfer structure being inductively coupled with only a portion of the perimeters of said coil turns, whereby only part of said external coil field is utilized for the forming operation.

9. Device for magnetic-pulse forming of metallic workpieces, comprising a work coil to be traversed by pulsating current, said coil having turns defining an internal magnetic field space and an external magnetic field space of which only said internal field space is located within said respective coil turns, a transfer structure inductively coupled with said coil in said external field space, said transfer structure having a recess for receiving the workpiece and imposing upon it a compressive forming effect due to the external coil field when in operation, said transfer structure being inductively coupled with only a portion of the perimeters of said coil turns, whereby only part of said external coil field is utilized for the forming operation, said coil turns being curved to a generally C-shaped configuration so that said external coil field is located partly within the central bight space and partly outside the outer perimetric portion of said C-configuration, and said coil having a lateral gap between the respective two ends of said C-configuration, said central bight space forming said recess for receiving the workpiece to be formed.

10. In a magnetic-pulse forming device according to claim 9, said transfer structure comprising an insert of electrically good conducting material in said bight space between said coil and the workpiece locality, said insert being composed of a plurality of mutually insulated parts and being axially insertable into said bight space.

11. In a magnetic-pulse forming device according to claim 10, said insert parts consisting of two half-portions having a division gap in a plane perpendicular to the radial axis of said lateral gap of said coil.

12. In a magnetic-pulse forming device according to claim 11, said coil being symmetrical to said lateral coil gap for inducing in said two half-portions of said insert respective currents of the same rotational sense.

13. A magnetic-pulse forming device according to claim 9, comprising a rigid holder structure tightly surrounding and bracing said outer perimeter portion of said C-configuration coil and having a gap aligned with said coil gap and forming a radial extension thereof.

14. A magnetic-pulse forming device according to claim 13, comprising electrically conducting filler structure filling said gaps of said coil and of said holder structure.

15. In a magnetic-pulse forming device according to claim 9, said coil having two half-portions and having hinge means joining them so as to permit turning said half-portions of said coil to open position relative to each other.

References Cited

UNITED STATES PATENTS

| | | | |
|---|---|---|---|
| 3,126,937 | 3/1964 | Brower et al. | 72—56 |
| 3,252,313 | 5/1966 | Eilers et al. | 72—56 |
| 3,253,443 | 5/1966 | Malmberg | 72—56 |

RICHARD J. HERBST, *Primary Examiner.*